US006735350B1

(12) United States Patent
Gauthier

(10) Patent No.: US 6,735,350 B1
(45) Date of Patent: May 11, 2004

(54) PASSIVE DEPOLARIZER

(75) Inventor: Brian C. Gauthier, Redmond, WA (US)

(73) Assignee: nLight Photonics Corporation, Seattle, WA (US)

( * ) Notice: Subject to any disclaimer, the term of this patent is extended or adjusted under 35 U.S.C. 154(b) by 0 days.

(21) Appl. No.: 10/097,471

(22) Filed: Mar. 14, 2002

Related U.S. Application Data

(60) Provisional application No. 60/316,802, filed on Aug. 31, 2001.

(51) Int. Cl.[7] .............................................. G02B 6/126
(52) U.S. Cl. ..................... 385/11; 398/152; 398/184; 372/6; 359/334
(58) Field of Search ............ 385/11; 359/192, 359/484, 333, 334; 372/6

(56) References Cited

U.S. PATENT DOCUMENTS

| | | | |
|---|---|---|---|
| 4,556,293 A | 12/1985 | Burns et al. | |
| 5,218,652 A | 6/1993 | Lutz | |
| 5,692,082 A | 11/1997 | Fukushima | |
| 5,910,852 A | 6/1999 | Fontana et al. | |
| 5,933,555 A | 8/1999 | Shen | |
| 6,052,394 A | * 4/2000 | Lee et al. ................ | 372/6 |
| 6,137,925 A | 10/2000 | Stimple et al. | |
| 6,147,757 A | 11/2000 | Shen et al. | |
| 6,192,062 B1 | 2/2001 | Sanchez-Rubio et al. | |
| 6,205,262 B1 | 3/2001 | Shen | |
| 6,208,679 B1 | 3/2001 | Sanchez-Rubio et al. | |
| 6,529,542 B1 | * 3/2003 | Karlsen et al. ........... | 372/108 |
| 2002/0181075 A1 | * 12/2002 | Fidric et al. .............. | 359/334 |
| 2003/0058899 A1 | * 3/2003 | Islam ........................... | 372/6 |
| 2003/0063833 A1 | * 4/2003 | Gonthier et al. ........... | 385/11 |

FOREIGN PATENT DOCUMENTS

| | | | | |
|---|---|---|---|---|
| EP | 490439 A1 | * 6/1992 | ........... | G02B/6/28 |
| JP | 06051243 A | * 2/1994 | ........... | G02B/27/28 |
| WO | WO0182426 | 11/2001 | | |

OTHER PUBLICATIONS

Shen, Paisheng, et al. "Fiber Recirculating Delay–Line Tunable Depolarizer," Applied Optics, vol. 37, No. 3, pp. 443–448, Jan. 20, 1998.
Canadian Instrumentation & Research, Ltd., "Product Data 905P," http://www.cirl.com/Data905p.htm, pp. 1–2, Dec. 18, 2001.
U.S. patent applicaton Ser. No. 60/316,802, Gauthier.
U.S. patent application Ser. No. 09/945,391, Farmer et al.

* cited by examiner

Primary Examiner—Hemang Sanghavi
Assistant Examiner—Scott A Knauss
(74) Attorney, Agent, or Firm—Fulbright & Jaworski LLP

(57) ABSTRACT

A polarized input optical beam enters a polarization beam splitter/combiner (PBC), where a first polarization component of the polarized input optical beam continues to propagate substantially entirely along a first optical path, whereas at least a portion of a second orthogonally polarized component switches onto a second optical path. A loop back optical fiber incorporated in at least one of the first and second optical paths, adds propagation delay length greater than the coherence length of the polarized input optical beam, giving rise to delayed and undelayed optical beam components, which are then incoherently recombined into a depolarized output optical beam.

25 Claims, 4 Drawing Sheets

PASSIVE DEPOLARIZER

CROSS-REFERENCE TO RELATED APPLICATIONS

The present patent application claims priority benefit of U.S. Provisional Patent Application Ser. No.60/316,802, filed Aug. 31, 2001, and is related to and commonly assigned U.S. application Ser. No. 09/945,381, filed Aug. 31, 2001.

BACKGROUND OF THE INVENTION

Modem long haul optical networks transmit optical signals through thousands of kilometers of optical fiber. To compensate losses due to attenuation in the fiber, optical amplifiers are deployed at roughly 100-km intervals. An emerging amplification technology uses the Raman scattering process in the transmission fiber. By using a high power optical pump source at a frequency roughly 13 THz above the signal frequency, optical gain is provided for the signal, thereby replenishing the power lost to fiber attenuation.

The Raman gain process is dependant on polarization; this means that only light of like polarization will interact to give a net Raman gain Because the Raman process is polarization dependent, use of a polarized pump source can lead to polarization dependent gain, thereby changing the polarization state of the signal. Polarization mode dispersion and other polarization dependent losses in the system can then degrade the quality of the signal. Because the fiber can scramble the signal polarization, it is not feasible to anticipate the instantaneous polarization state of the signal. It is therefore desirable to use a pump source that is unpolarized. Then, no matter what polarization state the signal happens to be, even if it rotates, the pump beam will amplify it uniformly.

There are only a few techniques that are successful in depolarizing a highly polarized source. The one most employed now in industry is the combination of two polarized beams from two separate lasers of the same wavelength at orthogonal polarizations. To obtain a depolarized Raman pump beam 15, conventionally two individual orthogonally polarized pump laser beams 13 and 14 of similar wavelength are polarization multiplexed using a device called a polarization beam combiner 10, illustrated in FIG. 1A. When beams 13 and 14 are multiplexed together, the effective polarization becomes random, because lasers 11 and 12 are incoherent with each other. Multiplexed beam 15 becomes depolarized, because the vector sum of the amplitudes of beams 13 and 14 at any polarization angle is uniform A rigorous polarization measurement would show a zero degree of polarization.

In this setup the relative intensities of the two lasers 11 and 12 must be equal to maintain the desired state of depolarization. The technology being what it is today, this is not a problem. The unattractive aspect of this scheme is the cost and size. The number of wavelengths at which the signal is pumped drives amplifier performance, indirectly. In this scheme, every added wavelength requires two DFB lasers and a means to combine them, increasing the size of the package and more than doubling the cost per wavelength Further, to be successful, this approach requires the use of two lasers of similar wavelength, which limits the ability of the pump laser to flatten the Raman gain profile. Additionally, the amplitudes of both source lasers must be actively controlled to be equal, or else one laser can dominate and actually increase the degree of linear polarization in the dominant direction.

BRIEF SUMMARY OF THE INVENTION

The present invention is directed to a system and method of providing a depolarized optical beam, comprising a passive depolarizer incorporating an optical polarization beam splitter/combiner (PBC) having a first and a second input port and having a first and a second output port optically connected respectively with the first and said second input port. The PBC is configured such that light having a first linear polarization and entering the PBC through said first input port propagates out substantially entirely through the first output port. At least a portion of light entering through the first input port and having a second linear polarization orthogonal to the first linear polarization is switched out through the second output port. Similarly, light of the first linear polarization entering said PBC through the second input port propagates substantially entirely out through the second output port, and at least a portion of light entering through the second input port and having the second linear polarization is switched out through the first output port.

The passive depolarizer includes a loop back light transmission guide connecting the second input port with one output port of the PBC. This loop back light transmission guide is configured to have an optical length greater than the coherence length of light entering the PBC through the first input port.

In operation, a polarized input optical beam enters the PBC, where the first polarization component of the polarized input optical beam continues to propagate substantially entirely along a first optical path, whereas at least a portion of the second orthogonally polarized component switches onto a second optical path. The loop back transmission guide adds propagation delay in at least one of the first and second optical paths, such that the delay path has a length greater than the coherence length of the polarized input optical beam, giving rise to delayed and undelayed optical beam components, which are then incoherently recombined into a depolarized output optical beam.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1A:
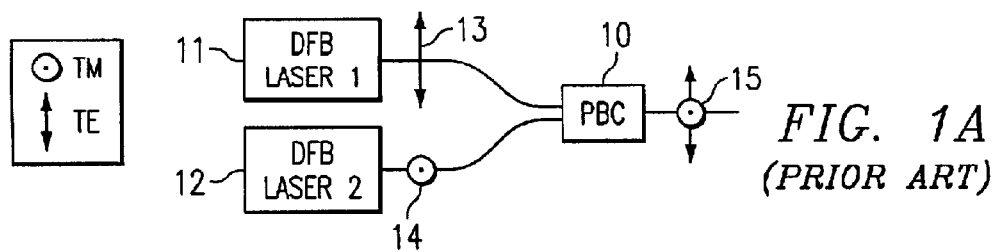
FIG. 1A illustrates schematically a prior art arrangement of two individual orthogonally polarized pump laser beams of similar wavelength polarization multiplexed using a polarization beam combiner.

There arc only a few techniques that are successful for depolarizing a highly polarized source. The approach currently most employed is a combination of two polarized beams from two separate lasers of the same wavelength at orthogonal polarizations, as described above in connection with FIG. 1A. This is conventionally done using a device called a Polarization Beam Splitter/Combiner (PBC) with two distributed feedback (DFB) lasers.

In this configuration, the relative intensities of the two lasers must be equal to maintain a desired degree of depolarization. Using current technology, this is not a problem, but the unattractive aspects are cost and size. The number of wavelengths by which the signal is pumped indirectly drives amplifier performance. In the current scheme, every added wavelength requires two added DFB lasers together with a means to combine their output beams, increasing the size of the package and more than doubling the cost per added wavelength.

Figure 1B:
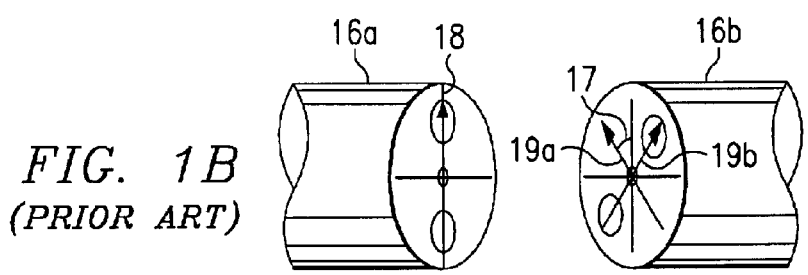
FIG. 1B depicts schematically an alternative prior art approach involving a "fiber Lyot Depolarizer"

A recent alternative approach involves what has been described as a "Fiber Lyot Depolarizer," depicted schematically in FIG. 1B. The Lyot depolarizer is based on a highly birefrigent (HiBi) or Polarization Maintaining (PM) fiber. PM fiber 16a, 16b has a stressed cross section that creates an index gradient in one axis that is higher than the orthogonal direction. This index variation as a function of polarization (birefringence) sets up the possibility for separating two polarization modes in the fiber by splitting PM fiber 16a, 16b, rotating it by 45 degrees 17, and splicing it back together (not shown). Light launched with polarization along one polarization axis 18 will come out with equal parts polarized along each axis 19a and 19b, separated in phase by a propagation delay.

This technique operates on the principle of many different polarizations over many different wavelengths, such that no one polarization is dominant, performing well with broadband sources but degrading in performance as the linewidth narrows. Importantly, each wavelength in a Raman pump spectrum needs to be individually depolarized. Depolarization averaged over the entire spectrum is inadequate, because each individual pump wavelength is pumping an individual signal wavelength and consequently must be individually depolarized.

A third alternative in accordance with embodiments of the present invention employs a loop-back depolarizer, which provides an integrated, all fiber-based, passive component that completely and efficiently randomizes the polarization state of a light source of arbitrarily narrow linewidth. It is superior to the two-laser combination technique, because it only requires one pump laser source, and is superior to the Lyot technique, because it operates over a broad pump wavelength spectrum made up of very narrow (<1 nm) individual linewidths. Although a variety of pump laser types can be employed in this approach, it is advantageous to use an incoherently beam combined (IBC) laser, which can produce a multi-wavelength output spectrum spanning a broad wavelength range that is well suited for pumping a Raman amplifier (See for example U.S. Pat. No. 6,052,394 issued Apr. 18, 2000 to Lee, et al.; U.S. Pat. No. 6,192,062/B1 issued Feb. 20, 2001 to Sanchez-Rubio, et al.; and U.S. Pat. No. 6,208,679/B1 issued Mar. 27, 2001 to Sanchez-Rubio, et al.).

A loop-back depolarizer works on the principle of coherence destruction, meaning that the input beam is split into two paths with one path being substantially longer than the other, such that the optical path difference (OPD) exceeds the coherence length (CL) of the beam. The coherence length of the beam is determined by the linewidth of the laser. For a given linewidth $\Delta \upsilon$ the coherence length is given as $$CL = \frac{c}{n(\Delta \upsilon)}, \quad (1)$$

where c/n is the velocity of light in the optical path medium having index n.

The coherence length in the fiber determines the difference in physical length between the two split paths. As an example, Table 1 compares relationships between linewidth and coherence length for a particular optical fiber medium and for air.

TABLE 1

| Linewidth $\Delta \upsilon$ Single Emitter (GHz) | Coherence Length Air (m) | Coherence Length Fiber (m) | Optical Medium | Index |
|---|---|---|---|---|
| 0.1 | 3.000 | 2.02429150 | Air | 1.000 |
| 1.0 | 0.300 | 0.20242915 | Fiber | 1.482 |
| 10.0 | 0.030 | 0.02024291 | | |
| 100.0 | 0.003 | 0.00202429 | | |

Loop-back depolarizers are described in the prior art (See for example U.S. Pat. No. 4,556,293 issued Dec. 3, 1985 to Burns, et al.; U.S. Pat. No. 5,218,652 issued Jun. 8, 1993 to Lutz; U.S. Pat. No. 5,692,082 issued Nov. 25, 1997 to Fukushima; U.S. Pat. No. 5,910,852 issued Jun. 8, 1999 to Fontana, et al.; U.S. Pat. No. 5,933,555 issued Aug. 3, 1999 to Shen; U.S. Pat. No. 6,137,925 issued Oct. 24, 2000 to Stimple, et al.; U.S. Pat. No. 6,147,757 issued Nov. 14, 2000 to Shen, et al.; and U.S. Pat. No. 6,205262/B1 issued Mar. 20, 2001 to Shen. See also Shen, et al., "Fiber Recirculating Delay-line Tunable Depolarizer," Applied Optics, v37, no. 3, pp. 443–448, Jan. 20, 1998.). Prior art loop-back depolarizers employ single mode fiber and 3 dB (50 percent) unpolarized couplers to create a propagation delay loop and employ polarization controllers to tune the polarization in the propagation delay loop. Many prior art loop-back depolarizers rely on birefringence in long fibers (typically 100 meters to 1 km in length, to provide a differential propagation path for orthogonally polarized light components greater than the coherence length of the laser source. Other prior art loop-back polarizers rely on random scrambling of polarizations through cascaded or iterative polarization rotation of light through series connected fibers or through successive cycles of splitting, loop-back, and recombining of light using a single fiber loop.

Unlike prior art loop-back depolarizers, in embodiments of the present invention a loop-back depolarizer uses 45 degree rotation as in the Lyot depolarizer, in order to propagate energy equally in both polarization axes, and a polarization beam splitter/combiner to split two polarization states of a single beam into two separate beams and to circulate one beam before recombining it incoherently with the other beam. The present embodiment includes two hardware components, namely a polarization beam splitter/combiner (PBC) and a PM fiber, which is integral with the polarization splitter/combiner. The present loop-back depolarizer embodiment utilizes a total of four optical ports in a two input port, two output port configuration.

Figure 2:
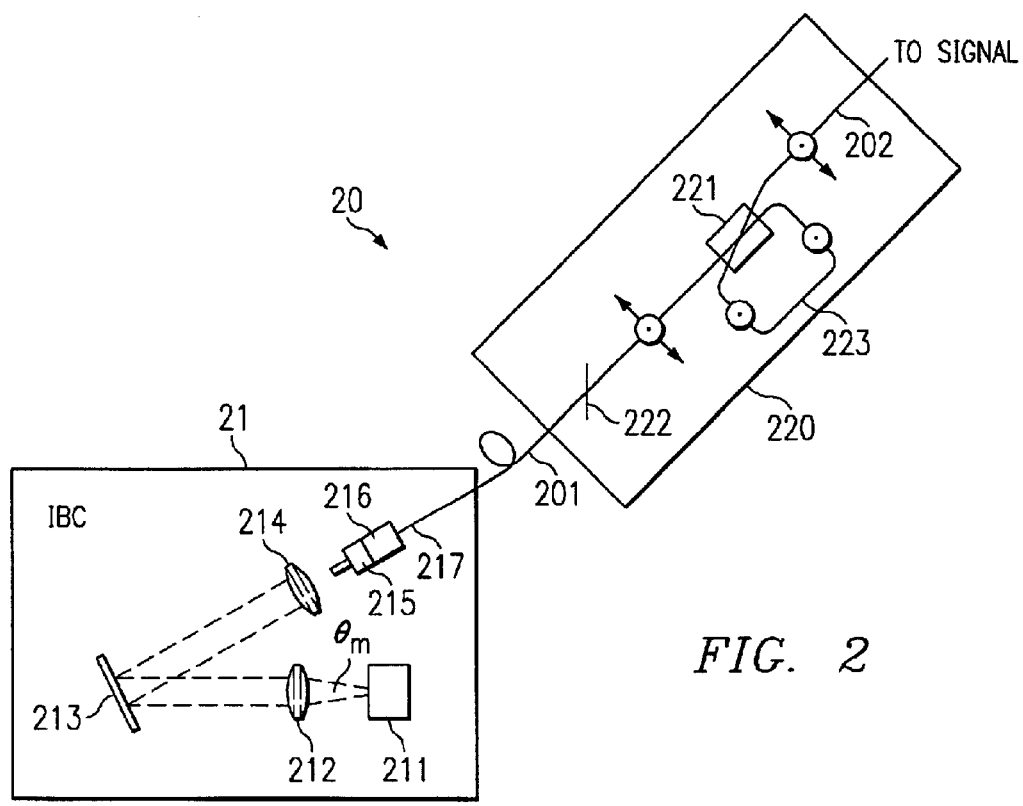
FIG. 2 is a schematic diagram depicting an optical system including an incoherently beam combined (IBC) laser.

FIG. 2 is a schematic diagram depicting system 20, including incoherently beam combined (IBC) laser 21 containing laser diode bar 211. Each diode emitter in diode bar 211 emits light at a divergence angle $\theta_m$, that is then collimated by collimator 212 and propagates to dispersive grating 213, which is located at the exit pupil of collimator 212, such that all of the emitter beams incident from various angles $\theta_m$ overlap. The overlapping emitter beams are focused into optical fiber 217 in fiber holder 215 by fiber focus lens 214. An output coupler is preferably integrated into fiber 217 as a fiber Bragg grating (FBG) 216, which provides feedback to each diode emitter to lock it to a desired frequency. The light at FBG 216 is linearly polarized in the plane of the diagram, because of losses associated with dispersive grating 213 at any other polarization, and because of the original polarization state of diode bar 211. Exiting IBC laser 21 into fiber 217 through FBG output coupler 216 and entering loop-back depolarizer 220 is light linearly polarized in the plane of the diagram. In some embodiments, the linear polarization is along the fast axis of a PM fiber. Alternatively, it can be along the slow axis, although the fast axis is preferred because of industry standard polishing practice.

Figure 3A:
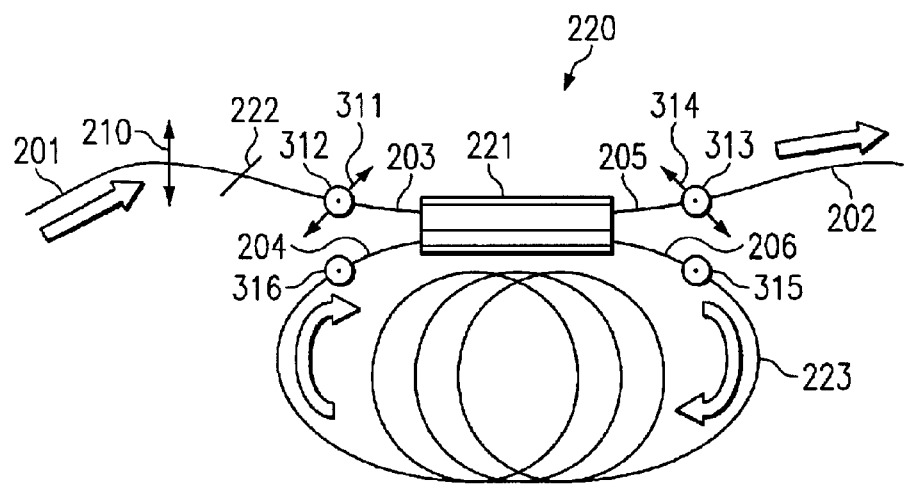
FIG. 3A is a schematic diagram illustrating a loop-back depolarizer in more detail.
Figure 3B:
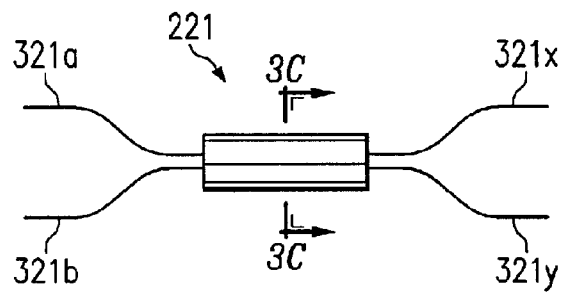
FIG. 3B schematically illustrates a conventional polarization beam splitter/combiner.

FIG. 3A is a schematic diagram illustrating loop-back depolarizer 220 in more detail. The purpose of loop-back depolarizer 220 is to convert linearly polarized light at entrance 201 to depolarized light at exit 202. At input PM fiber 201 of loop-back depolarizer 220, light is linearly polarized along the fast axis 210 of the PM fiber. At splice 222 a 45° rotation occurs in the physical axis of optical fiber 17, for example as illustrated in FIG. 1B, causing the amplitude of linear polarization to split equally between two fiber axes, e.g., light that is equal in amplitude on the fast axis and the slow axis, depicted symbolically at 311 and 312. At this point polarizations 311 and 312 still add coherently. Then polarization beam splitter/combiner 221 separates the polarizations into two arms 205 and 206. PBC 221 is often but not necessarily a conventional polarization beam splitter/combiner, as illustrated schematically in FIG. 3B.

Figure 3C:
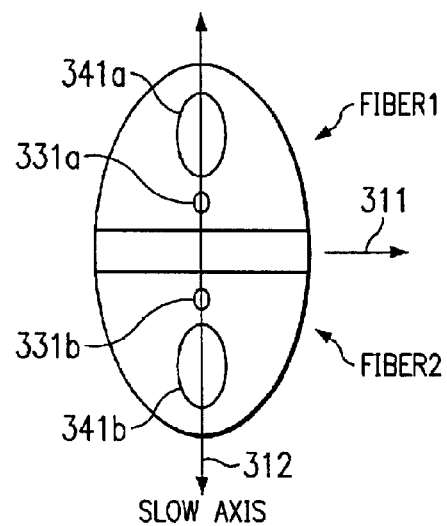
FIG. 3C schematically illustrates a section 3C—3C through the fiber implementation of FIG. 3B.

A PBC is a device that combines two polarization modes together on a single fiber. The same device in most cases can be used to separate two polarization modes. PBC 221 needs to have a total of 4 fiber ports, two in (321a–321b), and two out (321x–321y) in order to function in loop-back depolarizer 220. Since PBC devices are typically used for combining beams from two lasers, many commercially available PBCs use a 1×2 package standard. Theoretically PBC devices are the same whether using a 1×2 or 2×2 package, but the 1×2 package cannot be used for the present embodiment. FIG. 3C schematically illustrates a section through a fiber implementation taken along 3C—3C in FIG. 3B. Typically the cladding of fibers from ports 321a and 321b is polished off to a small distance from respective cores 331a and 331b, which are placed in close proximity along slow axis 312 under stress provided by symmetric stress structures 341a, 341b. The evanscent waves from the core of one fiber, e.g., core 331a, will transfer energy to the other fiber core, e.g., core 331b.

In operation, light input to the PBC device along slow axis 312 generally switches fibers, whereas light input along the fast axis 311 of the PBC device stays on the same fiber. With the exception of some added loss, light launched into either input fiber and will follow this general rule. Light that switches fibers undergoes more excess loss than light that stays on the same fiber, and light that switches fiber creates more crosstalk than light that stays on the same fiber, which is wavelength dependent. Moreover switched light is sensitive to polarization cross coupling, which creates a modulation of intensity from one axis to the other that is also wavelength dependent. This modulation transfers a wavelength-dependent variation in splitting ratio.

Exiting PBC 221 through exit arm 205 is light that is polarized along fast axis 314. Exiting through reloop-back arm 206 is light polarized along slow axis 315. The light that propagates along exit arm 205 continues out of loop-back depolarizer 220, whereas the light propagating along loop-back arm 206, e.g., the light polarized along the slow axis 315, 316 loops back through fiber loop 223, which is for example a length of PM fiber greater in length than the coherence length of IBC laser 21, and then returns through return arm 204 to PBC 221, which switches it back onto exit arm 205, producing exit light that is polarized along the fast axis co-propagating with light polarized along slow axis 313 but out of phase by greater than the coherence length with the light polarized along fast axis 314. Hence the two orthogonally polarized co-propagating beam components do not interfere to create circular polarization, but add in scalar intensity to create unpolarized light. The length of fiber in loop 223 is determined from linewidth $\Delta v$ of diode emitter bar 211, as previously described. Fiber loop 223 is polarization maintaining (PM) to stabilize the output polarization state.

PBC 221 is used both as a splitter and a combiner in loop-back depolarizer 220. Polarized light enters through entrance arm 203 into polarization beam splitter/combiner 221, which switches light polarized along the slow axis onto a different path. Any light polarized along the slow axis switches path at polarization beam splitter/combiner 221. Accordingly, when light polarized along the slow axis returns through return arm 204, it again switches path onto exit arm 205. If light polarized along the fast axis entered polarization beam splitter/combiner 221 along return arm 204, it would not switch path but would come out on loop-back arm 206 and continue through loop 223. If light polarized along the fast axis enters through entrance arm 203 into polarization beam splitter/combiner 221, it does not switch path but comes out through exit arm 205; however, if it enters through entrance arm 203 along the slow axis, it switches path to loop-back arm 206.

In some implementations, polarizations along respective fast and slow axes can be interchanged relative to those described above. Similarly, exit arm 205 and loop-back arm 206 can be interchanged as to their respective functions. Arm 205 can be shown in some circumstances to be advantageous as a loop-back arm. Due to losses in polarization beam splitter/combiner 221, using arm 205 as a loop-back arm and arm 206 as an exit arm can reduce system loss. Optionally, in alternative embodiments, the output coupler of the laser source, for example IBC laser 21, can be integrated into input fiber 201.

At splice 222, the angle of rotation need not necessarily be 45 degrees, because the polarized components propagating through PBC 221 see different losses from light coming through entrance arm 203 and coming out through loop-back arm 206. Splice 222 can be rotated to pre-compensate for loss differential in propagating through PBC 221, for example to transfer optical power from the fast axis to the slow axis on entrance arm 203. Every time a light beam switches path, it undergoes roughly 15 percent loss. If the two polarization amplitudes were initially equal, and one polarization experiences a 3 percent loss, but the other experiences a 15 percent loss, a 12 percent difference in output amplitude would result. Since it is important to maintain equal polarization amplitudes, it would be advantageous to increase power to one arm by rotating the fiber axes more or less to get not a 50/50 split, but for example a 60/40 split of amplitude between the two orthogonally polarized beam components.

Polarization cross-coupling is the transition of one polarization mode into another. In effect it is the leakage of light from one axis to another. In a PM fiber there are two axes defined by the difference in index built into the fiber, and cross coupling is the leakage of light bounded by one axis (index) mode into the other axis mode, e.g., fast axis (low index) to slow (high index) or vice versa. A typical PM fiber will provide isolation of between 25 and 35 db between these modes. Any external forces applied on the fiber can cause a degradation in isolation. These external forces can include bending stress, tension, compression, and heat. The simple act of cleaving a fiber can induce stress fractures in the structure of the fiber medium causing cross coupling at the tip of the fiber. Attaching a connector on a fiber also creates stresses on the fiber in the ferrule if the epoxy is not annealed as it cures.

Cascaded cross-coupled light is light that is cross-coupled and adds coherently with light already on the fiber. This light beats with the light already in the axis, creating a intensity modulation in the fiber. The propagation of light in the fiber over a given length creates a phase difference between polarization axes. Cascading even a small initial mount of cross-coupling through a system can result in a large modulation of intensity.

Figure 4A:
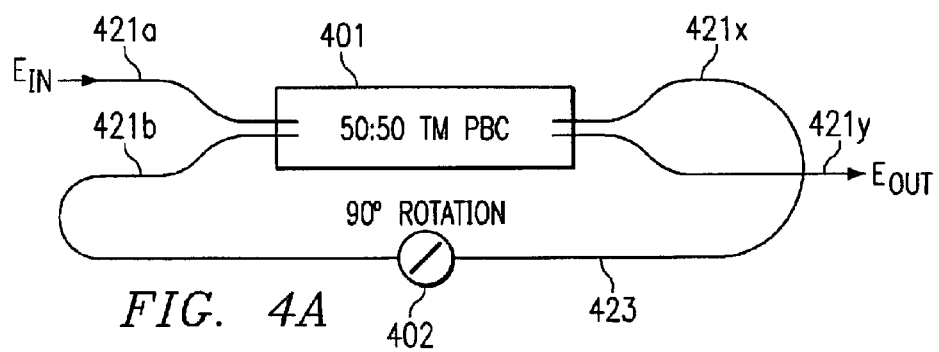
FIG. 4A is a simplified schematic diagram illustrating a loop back depolarizer according to an alternative embodiment of the invention.

In alternative embodiments of the present invention, a polarization beam splitter/combiner that couples only 50 percent of the appropriately polarized energy of an input beam replaces the previously described PBC, which couples 100 percent of the corresponding polarized energy. This alternative loop back depolarizer embodiment is again based on coherence destruction as in the previous version, but does not require a 45 degree polarization rotation at the input. This reduces the sensitivity of the system to cross coupling and decreases the sensitivity of the fiber lengths. FIG. 4A is a simplified schematic diagram illustrating a loop back depolarizer according to an alternative embodiment of the invention. The alternative loop back depolarizer of FIG. 4A is based on the principle of coherence destruction through fiber loop 423 as in the previously described embodiment, but does not require 45-degree polarization at input port 421a of 50 percent coupler/splitter 401. Fiber loop 423, connecting output port 421x to input port 421b, contains a 90-degree polarization rotator 402. Depolarized light exits through output port 421y.

Figure 4B:
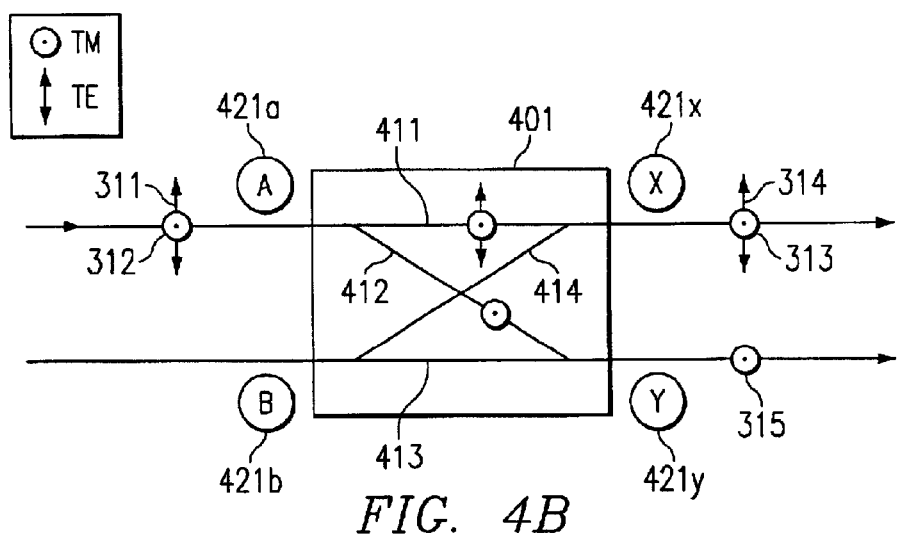
FIG. 4B is a schematic diagram further illustrating the operation of a 50 percent polarization beam splitter/combiner.

FIG. 4B is a schematic diagram further illustrating the operation of 50 percent polarization beam splitter/combiner 401. TM light (polarized along slow axis 311) inserted at input port 421a will split approximately 50 percent along propagation paths 411 and 412, whereas TE light (polarized along fast axis 311) will remain approximately 100 percent along propagation path 411. Through first output port 421x exit approximately 50 percent of TM and 100 percent of TE light. At second output port 421y the other approximately 50 per cent of TM light exits. Second input port 421b behaves substantially the same as first input port 421a, with incident TM light splitting approximately 50 percent each along propagation paths 414 and 413 to respective output ports 421x and 421y, and TE light propagating approximately 100 percent along propagation path 413 to output port 421y.

Connecting output port 421x to input port 421b will result in another 50 per cent split of TM light, substantially the equivalent of loop back depolarizer 220 (see FIG. 3A) for TM light. However, adding 90 degree rotation (cross-splice) 402 in fiber loop 423 between ports 421x and 421b (see FIG. 4A) results in a loop back depolarizer that is dependent on the splitting ratio of the coupler, e.g. 50 percent PBC 401, and works for both TM and TE polarizations. This happens because light that was TM at port 421x is now TE at port 421b and TE light at port 421x is now TM at port 421b. Since input port 421b behaves the same as input input port 421a, TE light passes through to output 421y, and TM light is spit by 50 per cent each to ports 421x and 421y. Thus TE light that passes from input port 421b to output port 421y is combined incoherently with TM light that has been passed directly from input port 421a to output port 421y, if fiber loop 423 is longer than the coherence length of the laser. TM light that is split and output at port 421x recombined with its counterpart after one additional pass through fiber loop 423 is consequently depolarized.

Figure 4C:
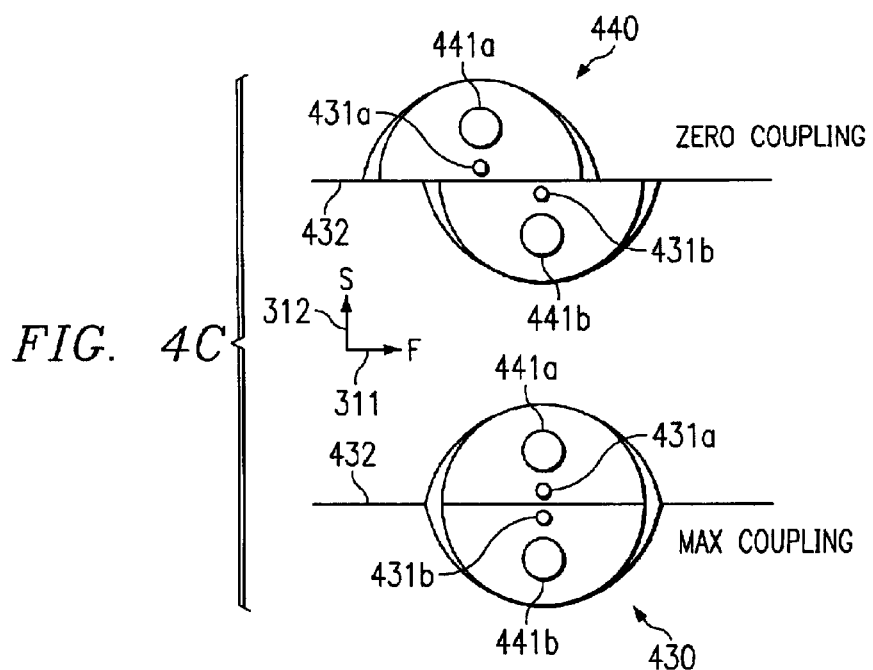
FIG. 4C is a schematic cross-sectional diagram illustrating a commercially available implementation of a variable ratio polarization coupler.

Polarization beam splitter/combiners having variable coupling ratios include both fiber based and free-spaced based implementations, which are familiar in the art. FIG. 4C is a schematic cross-sectional diagram illustrating a commercially available implementation of such a variable ratio polarization coupler (see for example Canadian Instrumentation & Research, Ltd., Burlington, Ontario, Canada L7L 5H9, Polarization Maintaining Variable Coupler Data Sheet 905P, http://www.cirl.com/Dat905p.htm). Configuration 430 shows the variable coupler configured for maximum coupling, such that fiber cores 431a and 431b are aligned in close proximity parallel to slow axis 312, similar to the PBC device of FIG. 3A. Stress structures are provided, as also shown in FIG. 3A. By contrast, configuration 440 shows a zero coupling configuration, in which fiber cores 431a and 431b are substantially offset from one another parallel to device midplane 432, parallel to fast axis 311 and normal to slow axis 312. In practice, implementations similar to that of FIG. 4C provide means for continuously varying the device configuration across the range from configuration 430 to configuration 440, using for example a differential micrometer and lever system.

Figure 5A:
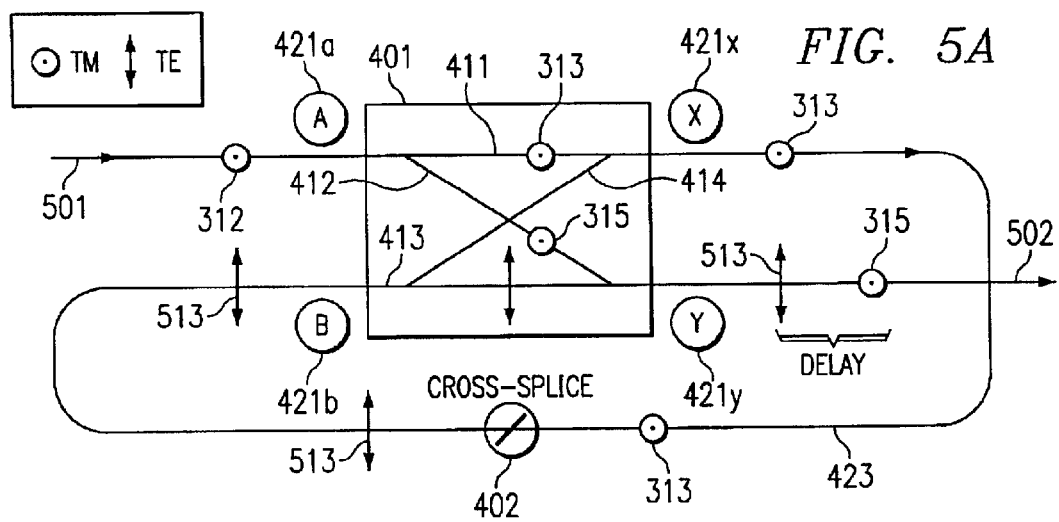
FIGS. 5A–5C illustrate in more detail the operation of the alternative loop-back polarizer embodiment of FIG. 4A.
Figure 5B:
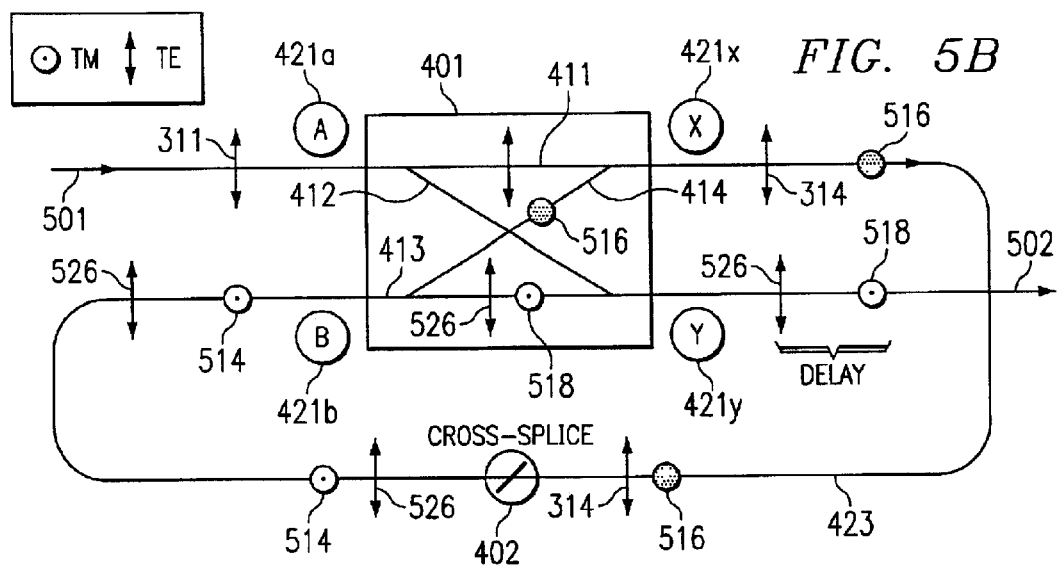
Figure 5C:
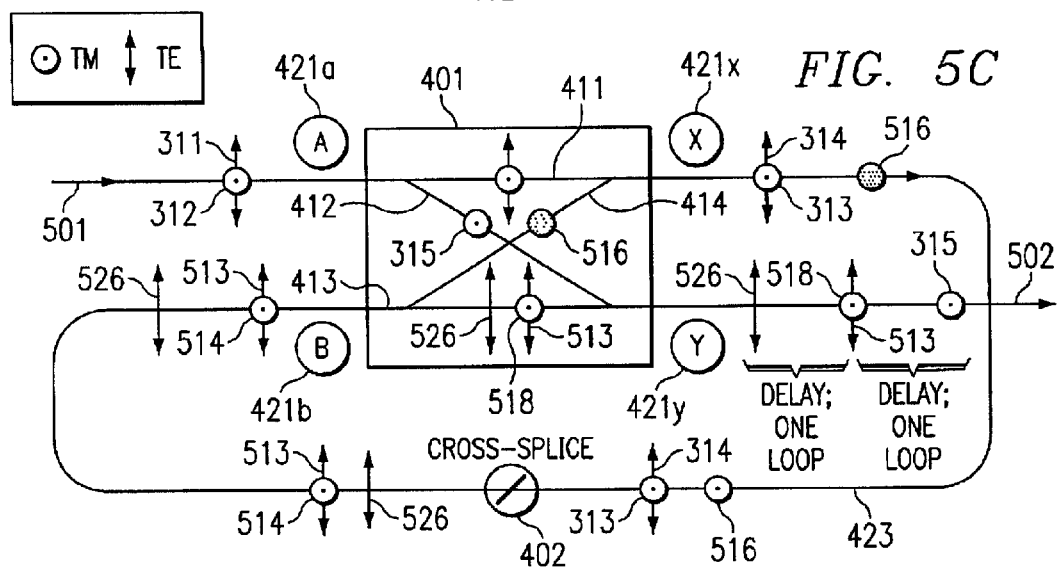

FIGS. 5A–5C illustrate in more detail the operation of the alternative loop-back polarizer embodiment of FIG. 4A by following the light one mode at a time through the system. In FIG. 5A, light consisting of 100 percent TM polarization 312 enters through input fiber 501 into input port 421a of 50 percent PBC 401, where 50 percent is split into TM beam 315 on propagation path 412 and exits into output fiber 502 through output port 421y, and 50 percent continues as TM beam 313 on propagation path 411 through output port 421x into fiber loop 423, which is longer than the coherence length of the laser that generated 100 percent TM input beam 312. At cross-splice 402, the polarization of 50 percent TM beam 313 is rotated by 90 degrees to produce 50 percent TE beam 513, which reenters 50 percent PBC 401 at input port 421b, where it is not split at all, but travels on propagation path 413 through output port 421y, where it adds incoherently to 50 percent TM beam 315 delayed by fiber loop 423 to form a depolarized output beam that exits through output fiber 502.

In FIG. 5B, light consisting of 100 percent TE polarization 311 enters through input fiber 501 into input port 421a of 50 percent PBC 401, where it is not split at all, but travels along propagation path 411 and exits as 100 percent TE beam 314 through output port 421x into fiber loop 423, which is longer than the coherence length of the laser that generated 100 percent TE input beam 311. At cross-splice 402, the polarization of 100 percent TE beam 314 is rotated by 90 degrees to produce 100 percent TM beam 514, which reenters 50 percent PBC 401 at input port 421b, where it is then split into 50 percent TM beam 518, which continues on propagation path 413 out through output port 421y onto output fiber 502, and 50 percent TM beam 516, which deflects onto propagation path 414 through output port 421x into fiber loop 423 for a second pass. At cross-splice 402, the polarization of 50 percent TM beam 516 is rotated 90 degrees, producing 50 percent TE beam 526, which reenters 50 percent PBC 401 at input port 421b, where it is not split at all, but travels on propagation path 413 through output port 421y, where it adds incoherently to 50 percent TM beam 518 delayed by fiber loop 423 to form a depolarized output beam that exits through output fiber 502.

In FIG. 5C, an input beam through input fiber 501 consists of a 50 per cent TE and 50 percent TM optical beam, which combine coherently to form either 45-degree linear polarization or circular polarization, since it originates from a single laser source and no depolarization takes place prior to 50 percent PBC 401. Each respective polarization of the input beam is processed exactly as described in connection with respective FIG. 5A or 5B. However, output polarization components 518 and 526 arising from TE input beam polarization component 311 are delayed by an extra cycle through fiber loop 423 relative to corresponding output polarization components 315 and 513 arising from TM input beam polarization component 312. Consequently TE output beam component 513 is synchronous and therefore coherent with TM output beam component 518.

Referring to FIGS. 5A–5C, it can be seen that this system depolarizes either 100 percent TM or 100 percent TE polarization input beams, but does not depolarize a coherent combination of these two orthogonal linear polarizations (linear polarization at 45 degree or circular polarization). In fact its performance degrades to 50 percent degree of polarization (DOP) as either of these polarizations is approached. This occurs because, referring to FIG. 5C, there are two polarization modes that are orthogonal and still coherent. This means that if two orthogonal polarizations of equal amplitude are 100 percent coherent at the input, they will be 50 percent coherent in the output. In contrast, the depolarizer configuration shown in FIG. 3A can depolarize a randomly polarized input beam.

For TM or TE input polarization mode then, the degree of polarization in the output is proportional to the split ratio of the PBC shown in FIGS. 5A–5C. If the split ratio is 50:50, then a DOP of less than one percent is expected, whereas with a split ration of 55:45 then a DOP of roughly 10 percent is expected. This means that the specification and performance of the coupler splitter is the principal factor influencing the performance of the system, which is not surprising since it is the only real component in the system.

Using simulation models, tolerances have been calculated for the system specifications, taking into account that the PBC has a variation of split ratio with wavelength along with the split ratio tolerance, and insertion losses. Results that meet a given DOP requirement are shown in Table 2. There is a substantial difference in complexity between the 10 percent and the 5 percent DOP, which is almost completely dependent on the isolation performance of the PBC.

TABLE 2

| SPECIFICATION FOR 50:50 TM PBC | | | |
|---|---|---|---|
| DOP(over 50 nm)* | <20% | <15% | <5% |
| Split Ratio Tol. (TM %) | 5% | 5% | 0% |
| Insertion Loss | <10% | <10% | <10% |
| Isolation (TE db) | 15 | 20 | 27 |
| λ dependence(%/%) | 2.5 | 2.5 | 1 |

*all numbers based on a 1 nm spectral window scanned over 50 nm.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A passive optical depolarizer comprising:
   an optical polarization beam splitter/combiner (PBC) having a first and a second input port and having a first and a second output port optically connected respectively with said first and said second input port, said PBC configured such that light having a first linear polarization and entering said PBC through said first input port propagates substantially entirely out through said first output port and substantially 50 percent of light entering through said first input port and having a second linear polarization orthogonal to said first linear polarization is switched out through said second output port and such that light having said first linear polarization and entering said PBC through said second input port propagates substantially entirely out through said second output port and substantially 50 percent of light entering through said second input port and having said second linear polarization is switched out through said first output port; and
   a loop back light transmission guide connecting said second input port with an output port of said PBC, said loop back light transmission guide configured to have an optical length greater than the coherence length of said light entering said PBC through said first input port.

2. The depolarizer of claim 1 wherein said loop back light transmission guide comprises a loop of polarization maintaining (PM) optical fiber.

3. The depolarizer of claim 1 wherein said loop back light transmission guide connects said second input with said second output port of said PBC.

4. The depolarizer of claim 3 further comprising polarizing means, said polarizing means being connected optically with said first input through an input light transmission guide.

5. The depolarizer of claim 4 wherein said input light transmission guide comprises an input PM optical fiber and said polarizing means comprises a polarization rotated splice in said input PM optical fiber.

6. The depolarizer of claim 5 wherein the polarization axes of said input PM fiber are rotated by approximately 45 degrees at said splice.

7. The depolarizer of claim 3 wherein said PBC is configured such that substantially 100 percent of light entering through said first input port and having said second linear polarization is switched out through said second output port and substantially 100 percent of light entering through said second input port and having said second linear polarization is switched out through said first output port.

8. The depolarizer of claim 2 wherein said loop of PM optical fiber connects said second input port with said first output port of said PBC.

9. The depolarizer of claim 8 wherein said loop of PM optical fiber contains a polarization rotating component.

10. The depolarizer of claim 9 wherein said polarization rotating component is configured to rotate by approximately 90 degrees the polarization of light propagating in said loop of PM optical fiber.

11. The depolarizer of claim 9 wherein said polarization rotating component comprises a polarization rotated cross-splice in said loop of PM optical fiber.

12. A method of passive depolarization of a polarized input optical beam, said method comprising:
providing a polarized input optical beam comprising a substantially 100 percent first polarization component;
propagating said first polarization component of said polarized input optical beam substantially entirely along a first optical path comprising a delay path;
switching at least a portion of a second polarization component of said polarized input optical beam onto a second optical path, said second polarization component being polarized substantially orthogonal to said first polarization component;
rotating polarization of said propagating first polarization component by 90 degrees to become a substantially 100 percent second polarization component;
splitting said polarization rotated component, approximately 50 percent second polarization component propagating onto said second optical path and approximately 50 per cent second polarization component switching back again onto said first optical path, rotating polarization again by 90 degrees to become approximately 50 percent first polarization component;
delaying optical propagation on said delay path said delay path having a length greater than the coherence length of said polarized input optical beam, such that delayed and undelayed optical beam components are produced; and
incoherently recombining said delayed and undelayed optical beam components into a depolarized output optical beam, such that said approximately 50 percent first polarization component is incoherently recombined with said approximately 50 percent second polarization component propagating on said second optical path.

13. A system for providing a depolarized optical beam, comprising a passive depolarizer incorporating:
an optical polarization beam splitter/combiner (PBC) having a first and a second input port and having a first and a second output port optically connected respectively with said first and said second input port, said PBC configured such that light having a first linear polarization and entering said PBC through said first input port propagates substantially entirely out through said first output port and at least a portion of light entering through said first input port and having a second linear polarization orthogonal to said first linear polarization is switched out through said second output port and such that light having said first linear polarization and entering said PBC through said second input port propagates substantially entirely out through said second output port and at least a portion of light entering through said second input port and having said second linear polarization is switched out through said first output port; and
a loop back light transmission guide connecting said second input port with said first output port of said PBC, said loop hack light transmission guide comprising a loop of polarization maintaining (PM) optical fiber containing a polarization rotating component, and said loop back light transmission guide configured to have an optical length greater than the coherence length of said light entering said PBC through said first input port.

14. The system of claim 13 wherein said polarization rotating component is configured to rotate by approximately 90 degrees the polarization of light propagating in said loop of PM optical fiber.

15. The system of claim 13 wherein said polarization rotating component comprises a polarization rotated cross-splice in said loop of PM optical fiber.

16. The system of claim 13 further comprising a laser source.

17. The system of claim 16 wherein said laser source is an incoherently beam combined (IBC) laser.

18. A passive optical depolarizer comprising:
an optical polarization beam splitter/combiner (PBC) having a first and a second input port and having a first and a second output port optically connected respectively with said first and said second input port, said PBC configured such that light having a first linear polarization and entering said PBC through said first input port propagates substantially entirely out through said first output port and at least a portion of light entering through said first input port and having a second linear polarization orthogonal to said first linear polarization is switched out through said second output port and such that light having said first linear polarization and entering said PBC through said second input port propagates substantially entirely out through said second output port and at least a portion of light entering through said second input port and having said second linear polarization is switched out through said first output port; and
a loop back light transmission guide connecting said second input port with an output port of said PBC, said loop back light transmission guide configured to have an optical length greater than the coherence length of said light entering said PBC through said first input port, wherein said loop back light transmission guide comprises a loop of polarization maintaining (PM) optical fiber connecting said second input port with said first output port of said PBC, said loop of PM optical fiber containing a polarization rotating component.

19. The depolarizer of claim 18 wherein said polarization rotating component is configure to rotate by approximately 90 degrees the polarization of light propagating in said loop of PM optical fiber.

20. The depolarizer of claim 18 wherein said polarization rotating component comprises a polarization rotated cross-splice in said loop of PM optical fiber.

21. The depolarizer of claim 18 wherein said PBC is configured such that substantially 50 percent of light entering through said first input port and having said second linear polarization is switched out through said second output port and substantially 50 per cent of light entering through said second input port and having said second linear polarization is switched out through said first output port.

22. A method of passive depolarization of a polarized input optical beam said method comprising:

providing a first optical path comprising a delay path;

providing a second optical path differing from said first optically path;

providing a polarized input optical beam comprising a substantially 100 percent second polarization component, said second polarization component polarized substantially orthogonal to a first polarization component;

splitting said polarized input optical beam, approximately 50 percent second polarization component switching onto said second optical path and approximately 50 per cent second polarization component propagating on said delay path, rotating polarization by 90 degree become approximately 50 percent first polarization component;

delaying optical propagation on said delay path, said delay path having a length greater than the coherence length of said polarized input optical beam, such that delayed and undelayed optical beam components are produced; and incoherently recombining said delayed and undelayed optical beam components into a depolarized output optical beam, such that said 50 percent first polarization component is incoherently recombined with said approximately 50 percent second polarization component propagating on said second optical path.

23. A system for providing a depolarized optical beam, comprising a passive depolarizer incorporating:

an optical polarization beam splitter combiner (PBC) having a first and a second input port and having a first and a second output port optically connected respectively with said first and said second input port, said PBC configured such that light having a first linear polarization and entering said PBC through said first input port propagates substantially entirely out through said first output port an substantially 50 percent of light entering through said first input port and having a second linear polarization orthogonal to said first linear polarization is switched out through said second output port and such that light having said first linear polarization and entering said PBC through said second input port propagates substantially entirely out through said second output port and substantially 50 percent of light entering through said second input port and having said second linear polarization is switched out through said first output port; and a loop back light transmission guide connecting said second input port with an output port of said PBC, said loop back light transmission guide configured to have an optical length greater than the coherence length of said light entering said PBC through said first input port.

24. The system of claim 23 further comprising a laser source.

25. The system of claim 24 wherein said laser source is an incoherently beam combined (IBC) laser.

* * * * *